United States Patent
Knostman et al.

(10) Patent No.: US 11,347,612 B2
(45) Date of Patent: May 31, 2022

(54) DISTRIBUTED LEDGER FOR TRACKING A CONDITION OF AN ELECTRONIC DEVICE

(71) Applicant: T-Mobile USA, Inc., Bellevue, WA (US)

(72) Inventors: Charles Knostman, Bainbridge Island, WA (US); Christopher Spanton, Seattle, WA (US); Yunhang Chen, Atlanta, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 205 days.

(21) Appl. No.: 16/528,533

(22) Filed: Jul. 31, 2019

(65) Prior Publication Data

US 2021/0034490 A1    Feb. 4, 2021

(51) Int. Cl.
*H04L 9/06* (2006.01)
*G06F 11/30* (2006.01)
*G06F 16/182* (2019.01)

(52) U.S. Cl.
CPC ...... *G06F 11/3058* (2013.01); *G06F 11/3003* (2013.01); *G06F 16/1834* (2019.01); *H04L 9/0637* (2013.01)

(58) Field of Classification Search
CPC ............. G06F 11/3058; G06F 11/3003; G06F 16/1834; G06F 16/27; G06F 11/3065; H04L 9/0637; H04L 2209/38; H04L 2209/80; H04L 9/3239; H04W 12/03
See application file for complete search history.

(56) References Cited

U.S. PATENT DOCUMENTS

| | | | |
|---|---|---|---|
| 7,561,877 B2 | 7/2009 | Cassett | |
| 7,978,639 B2 | 7/2011 | Maltseff et al. | |
| 8,055,622 B1 | 11/2011 | Botes et al. | |
| 9,763,029 B2 | 9/2017 | Mirza et al. | |
| 9,973,565 B2 | 5/2018 | Stone et al. | |
| 10,163,080 B2 | 12/2018 | Chow et al. | |
| 10,171,992 B1 | 1/2019 | Viswanathan et al. | |
| 10,181,948 B1 | 1/2019 | Nenov et al. | |
| 10,185,550 B2 | 1/2019 | Smith et al. | |
| 10,262,140 B2 | 4/2019 | Smith et al. | |
| 10,721,274 B1* | 7/2020 | Prasad | H04L 41/142 |
| 10,915,891 B1* | 2/2021 | Winklevoss | G06Q 20/3678 |
| 11,139,955 B1* | 10/2021 | So | G06Q 20/4014 |
| 11,150,271 B2* | 10/2021 | Almeida Cavoto | G06Q 20/36 |
| 11,212,871 B2* | 12/2021 | Koeppel | H04W 4/80 |

(Continued)

*Primary Examiner* — John E Breene
*Assistant Examiner* — Eyob Hagos
(74) *Attorney, Agent, or Firm* — Perkins Coie LLP

(57) ABSTRACT

Systems and methods are described herein for determining a current condition of an electronic device configured to communicate over a wireless network. For example, the method can include collecting units of condition data of the electronic device. In some instances, each unit of condition data is generated by a sensor of the electronic device that performs an ongoing measurement of a parameter of the electronic device or detects an occurrence of an event that affects the condition of the electronic device. The electronic device provides the units of condition data over a network to a manager node. The units of condition data are then stored in a distributed ledger. The network node can determine a current condition of the electronic device based on the units of condition data stored in the distributed ledger.

20 Claims, 5 Drawing Sheets

(56) References Cited

U.S. PATENT DOCUMENTS

| | | | |
|---|---|---|---|
| 2014/0189056 A1* | 7/2014 | St. Clair | H04L 67/303 |
| | | | 709/217 |
| 2015/0348055 A1* | 12/2015 | Smits | G06Q 30/018 |
| | | | 705/317 |
| 2018/0013464 A1* | 1/2018 | Phung | H04W 88/02 |
| 2018/0159682 A1 | 6/2018 | Futcher et al. | |
| 2019/0065733 A1 | 2/2019 | Forehand | |
| 2019/0081784 A1 | 3/2019 | Carey | |
| 2019/0104102 A1 | 4/2019 | Khan et al. | |
| 2019/0158270 A1* | 5/2019 | Berti | H04L 9/3239 |
| 2020/0394159 A1* | 12/2020 | Hurley | H04L 63/123 |
| 2021/0027221 A1* | 1/2021 | Balakrishnan | G06F 11/3006 |
| 2021/0218710 A1* | 7/2021 | Fallah | G06F 16/9024 |

* cited by examiner

DISTRIBUTED LEDGER FOR TRACKING A CONDITION OF AN ELECTRONIC DEVICE

BACKGROUND

Mobile phones have become ubiquitous as basic communications tools. They are not only used for calls, but also to access the Internet, send text messages, and capture images. Telecommunications carriers offer flexible options to make mobile phones broadly available to customers. In addition to paying full price or buying a lower-cost, subsidized mobile phone in exchange for signing a multi-year contract, customers can subscribe to pay-to-own equipment installment plans (EIP) along with leasing options.

A customer has an option to resell an existing phone to upgrade to a newer mobile phone. The resale value normally depends on a subjective assessment of the mobile phone's condition. For example, a carrier normally asks the customer for a perceived condition of the mobile phone as either "good," "fair," or "poor." The mobile phone is received for processing by the carrier, and a technician performs a manual inspection to assess the mobile phone's condition. The technician may compare the features of the mobile phone against a checklist to determine the mobile phone's resale value. The technician can visually inspect the mobile phone for any visible defects such as dents, scuffs, or cracks. The technician can also use tools to inspect the mobile phone's functionality. For example, the technician can use a diagnostic tool to determine a battery's ability to hold a charge. However, the technician cannot readily determine whether the mobile phone experienced certain events that would affect the integrity of the mobile phone. For example, the technician cannot determine how often the mobile phone was dropped by the customer.

Thus, methods for assessing a current condition of a mobile phone are unreliable. These methods are also untrustworthy because a customer is inclined to report a higher value while a carrier is motivated to find a lower value. As a result, a customer unfairly receives less credit for resale value or the carrier grants too much credit for a compromised device. Hence, a need exists to readily make a reliable, objective, and accurate assessment of a mobile phone's condition.

BRIEF DESCRIPTION OF THE DRAWINGS

Embodiments of the present technology will be described and explained through the use of the accompanying drawings.

Figure 1:
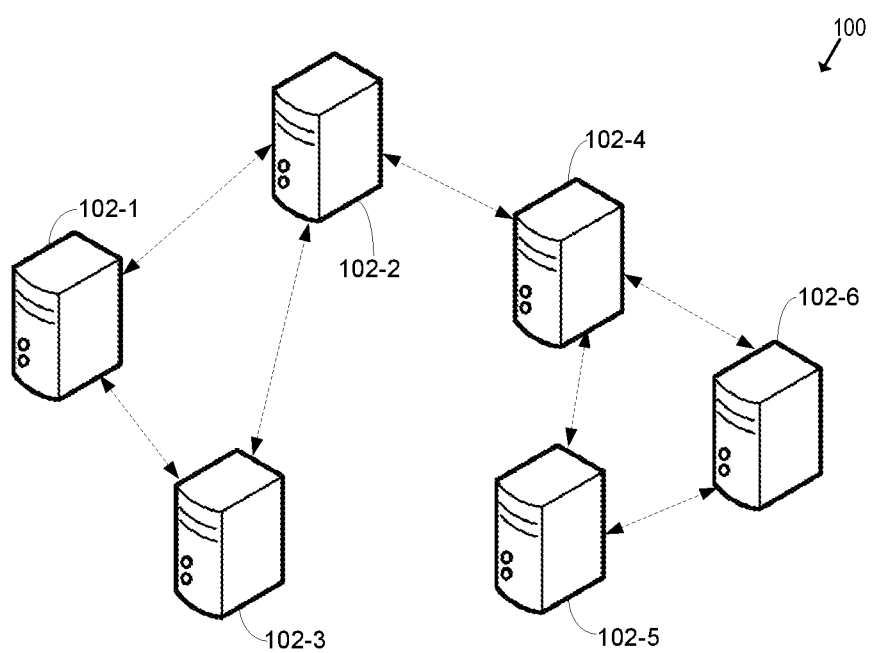
FIG. 1 is a block diagram that illustrates a network of peer nodes that can store a distributed ledger.

The drawings, some components and/or operations can be separated into different blocks or combined into a single block when discussing some embodiments of the present technology. Moreover, while the technology is amenable to various modifications and alternative forms, specific embodiments have been shown by way of example in the drawings and are described in detail below. The intention, however, is not to limit the technology to the particular embodiments described herein. On the contrary, the technology is intended to cover all modifications, equivalents, and alternatives falling within the scope of the technology as defined by the appended claims.

DETAILED DESCRIPTION

The disclosed systems and methods enable performance of a reliable, objective, and trustworthy determination of a current condition of an electronic device. For example, a dedicated mobile application on a smartphone can collect data indicative of the condition of the electronic device. The condition data is collected and stored on a tamper-proof distributed ledger. The resale value of the electronic device is determined based on the condition data stored on the distributed ledger thereby obviating the need for an unreliable and untrustworthy subjective assessment.

The condition data is generated by sensors in the electronic device. For example, the mobile application can collect data about battery statistics, accelerometer readings, etc. The electronic device can push out condition data periodically, or in response to a detected event, to a remote manager node that distributes the condition data for storing in a distributed ledger. The condition data is aggregated and compared against a device-specific standard or statistical data to determine a current condition for the electronic device. For example, device-specific data can correspond to device-specific manufacturers and models.

By storing the condition data in a distributed ledger, the challenges of obtaining trustworthy data to measure the condition of an electronic device are eliminated. That is, the disclosed embodiments use the distributed ledger as an immutable, trustworthy, and secure data repository where electronic devices can post data about monitored parameters to indicate their conditions. The condition data can be communicated and stored regularly or upon the occurrence of an event that affects the condition of an electronic device. The disclosed technology can be used to track the condition of any Internet-of-Things devices or anything else where the condition of an object dictates its value.

Various embodiments of the disclosed systems and methods are described. The following description provides specific details for a thorough understanding and an enabling description of these embodiments. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific embodiments of the invention.

Although not required, embodiments are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein and refer to any of the above devices and systems, as well as any data processor.

While aspects of the disclosed embodiments, such as certain functions, can be performed exclusively or primarily on a single device, some embodiments can also be practiced in distributed environments where functions or modules are shared among disparate processing devices, which are linked through a communications network, such as a local area network (LAN), wide area network (WAN), or the Internet. In a distributed computing environment, program modules can be located in both local and remote memory storage devices.

Aspects of the invention can be stored or distributed on tangible computer-readable media, including magnetically or optically readable computer discs, hardwired or preprogrammed chips (e.g., EEPROM semiconductor chips), nanotechnology memory, biological memory, or other data storage media. In some embodiments, computer-implemented instructions, data structures, screen displays, and other data under aspects of the invention can be distributed over the Internet or over other networks (including wireless networks), on a propagated signal on a propagation medium (e.g., an electromagnetic wave(s), a sound wave) over a period of time, or they can be provided on any analog or digital network (packet-switched, circuit-switched, or other scheme).

Distributed Ledger

In layman's terms, a digital distributed ledger stores digital records of things such as transactions that are distributed and maintained among nodes of a computer network, where the entries are stored in blocks of the ledger that are cryptographically related. A public blockchain is a common example of a distributed ledger that can record transactions between parties in a verifiable and permanent way. Specifically, a blockchain system has a decentralized, distributed database where a ledger is maintained by peer nodes. Hence, an intermediary is not required to maintain a blockchain. The transactions are typically authenticated with cryptographic hashing and mining techniques.

A blockchain is analogous to a distributed database on a distributed computing system that maintains a continuously growing list of ordered records called blocks. A block of a blockchain includes records of transaction(s) or other recorded data (e.g., condition data). Each block contains at least one timestamp, and a block links to a previous block to thus form a chain of blocks. Blockchains are inherently resistant to modification of their recorded data. That is, once recorded, the data in a block cannot be altered retroactively. Through a peer network and distributed timestamping, a blockchain is managed in an autonomous manner.

Decentralized consensus can be achieved with a blockchain. This makes blockchains suitable for recording events, condition records, other records management activities, identity management, transaction processing, and proving data provenance. Well-known examples of decentralized systems that implement blockchains include Bitcoin and Ethereum cryptocurrencies. These types of systems provide a pragmatic solution for arriving at a consensus in the face of trust and timing problems typically encountered in distributed networks.

FIG. 1 illustrates a network 100 of interconnected peer nodes 102-1 through 102-6 (also referred to collectively as peer nodes 102 and individually as peer node 102). The peer nodes 102 can be distributed across various geographic locations including regions all over the world. The network 100 can include a combination of private, public, wired, or wireless portions. Data communicated over the network 100 can be encrypted or unencrypted at various locations or portions of the network 100. Each peer node 102 can include combinations of hardware and/or software to process data, perform functions, communicate over the network 100, and the like.

The peer nodes 102 can include computing devices such as servers, desktop or laptop computers (e.g., APPLE MACBOOK, LENOVO 440), handheld mobile devices (e.g., APPLE (PHONE, SAMSUNG GALAXY), and any other electronic device. Any component of the network 100 can include a processor, memory or storage, a network transceiver, a display, operating system and application software (e.g., for providing a user interface), and the like. Other components, hardware, and/or software included in the network 100 that are well known to persons skilled in the art are not shown or discussed herein for the sake of brevity.

The network 100 can implement a blockchain that allows for the secure management of a shared ledger, where transactions are verified and stored on the network 100 without a governing central authority. Blockchains can be implemented in different configurations, ranging from public, open-source networks, to private blockchains that require explicit permission to read or write transactions. Central to a blockchain are cryptographic hash functions that secure the network 100, in addition to enabling transactions, to protect a blockchain's integrity and anonymity.

The network 100 can utilize cryptography to securely process data. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key can be widely distributed, while the private key is known only to its proprietor. The keys are related mathematically, but the parameters are chosen so that calculating the private key from the public key is unfeasible. Moreover, the keys could be expressed in various formats, including hexadecimal format.

System Overview

Figure 2:
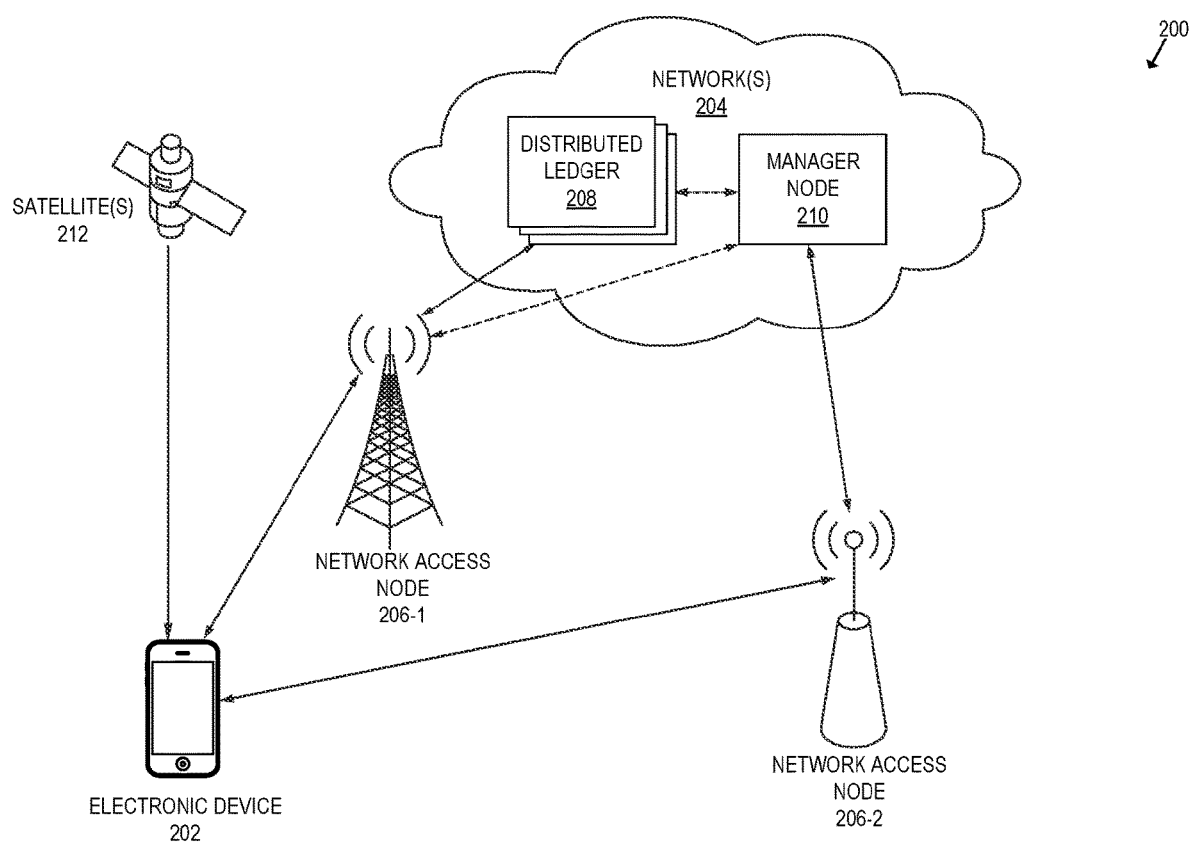
FIG. 2 is a block diagram that illustrates a system that can determine current conditions of electronic devices.

FIG. 2 is a block diagram that illustrates a system that can determine current conditions of electronic devices. The system 200 includes an electronic device 202 that is communicatively coupled to one or more networks 204 via network access nodes 206-1 and 206-2 (referred to collectively as network access nodes 206).

The electronic device 202 is any type of electronic device that can communicate wirelessly with a network node and/or with another electronic device in a cellular, computer, and/or mobile communications system. Examples of the electronic device 202 includes smartphones (e.g., APPLE (PHONE, SAMSUNG GALAXY), tablet computers (e.g., APPLE IPAD, SAMSUNG NOTE, AMAZON FIRE, MICROSOFT SURFACE), wireless devices capable of machine-to-machine (M2M) communication, wearable electronic devices, movable Internet of Things devices (IoT devices), and any other handheld device that is capable of accessing the network(s) 204. Although only one electronic device 202 is illustrated in FIG. 2, the disclosed embodiments can include any number of electronic devices.

The electronic device 202 can store and transmit (e.g., internally and/or with other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The electronic device 202 can include hardware such as one or more processors coupled to sensors and a non-transitory machine-readable media to store code and/or sensor data, user input/output (I/O) devices (e.g., a keyboard, a touchscreen, and/or a display), and network connections (e.g., an antenna) to transmit code and/or data using propagating signals. The coupling of the processor(s) and other components is typically through one or more busses and bridges (also referred to as bus controllers). Thus, a non-transitory machine-readable medium of a given electronic device typically stores instructions for execution on a processor(s) of that electronic device. One or more parts of an embodiment of the present disclosure can be implemented using different combinations of software, firmware, and/or hardware.

The network access nodes 206 can be any type of radio network node that can communicate with a wireless device (e.g., electronic device 202) and/or with another network node. The network access nodes 206 can be a network device or apparatus. Examples of network access nodes include a base station (e.g., network access node 206-1), an access point (e.g., network access node 206-2), or any other type of network node such as a network controller, radio network controller (RNC), base station controller (BSC), a relay, transmission points, and the like.

The system 200 depicts different types of wireless access nodes 206 to illustrate that the electronic device 202 can access different types of networks through different types of network access nodes. For example, a base station (e.g., the network access node 206-1) can provide access to a cellular telecommunications system of the network(s) 204. An access point (e.g., the network access node 206-2) is a transceiver that provides access to a computer system of the network(s) 204.

The network(s) 204 can include any combination of private, public, wired, or wireless systems such as a cellular network, a computer network, the Internet, and the like. Any data communicated over the network(s) 204 can be encrypted or unencrypted at various locations or along different portions of the networks. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G or 5G wireless wide area networks (WWAN), and other systems that can also benefit from exploiting the scope of this disclosure.

The system 200 includes a distributed ledger 208 that stores condition data generated by the electronic device 202 and communicated to the distributed ledger 208 via the network access nodes 206. The distributed ledger 208 is distributed over a combination of network nodes (e.g., peer nodes 102) that store condition data across other network nodes of a peer-to-peer network. The network nodes of the distributed ledger 208 can each replicate and store an identical copy of the condition data and update independently. Although shown in the network(s) 204, the distributed ledger 208 can be located anywhere to maintain a tamper-proof copy of condition data.

The system 200 includes a manager node 210 that can mediate the flow of condition data from the electronic device 202 to the distributed ledger 208. In some embodiments, the manager node 210 can include any number of server computers communicatively coupled to the electronic device 202 via the network access nodes 206. The manager node 210 can include combinations of hardware and/or software to process condition data, perform functions, communicate over the network(s) 204, etc. For example, server computers of the manager node 210 can include a processor, memory or storage, a transceiver, a display, operating system and application software, and the like. Other components, hardware, and/or software included in the system 200 that are well known to persons skilled in the art are not shown or discussed herein for brevity. Moreover, although shown as being included in the network(s) 204, the manager node 210 can be located anywhere in the system 200 to implement the disclosed technology.

The manager node 210 can determine the current resale value of the electronic device 202. The manager node 210 can also control which types of parameters are monitored by the electronic device 202 and select events to report to the manager node 210. In some embodiments, condition data could have values that depend on the estimated geographic location of the electronic device 202. The electronic device 202 can estimate its location from global positioning system (GPS) signals received from the satellites 212.

Figure 3:
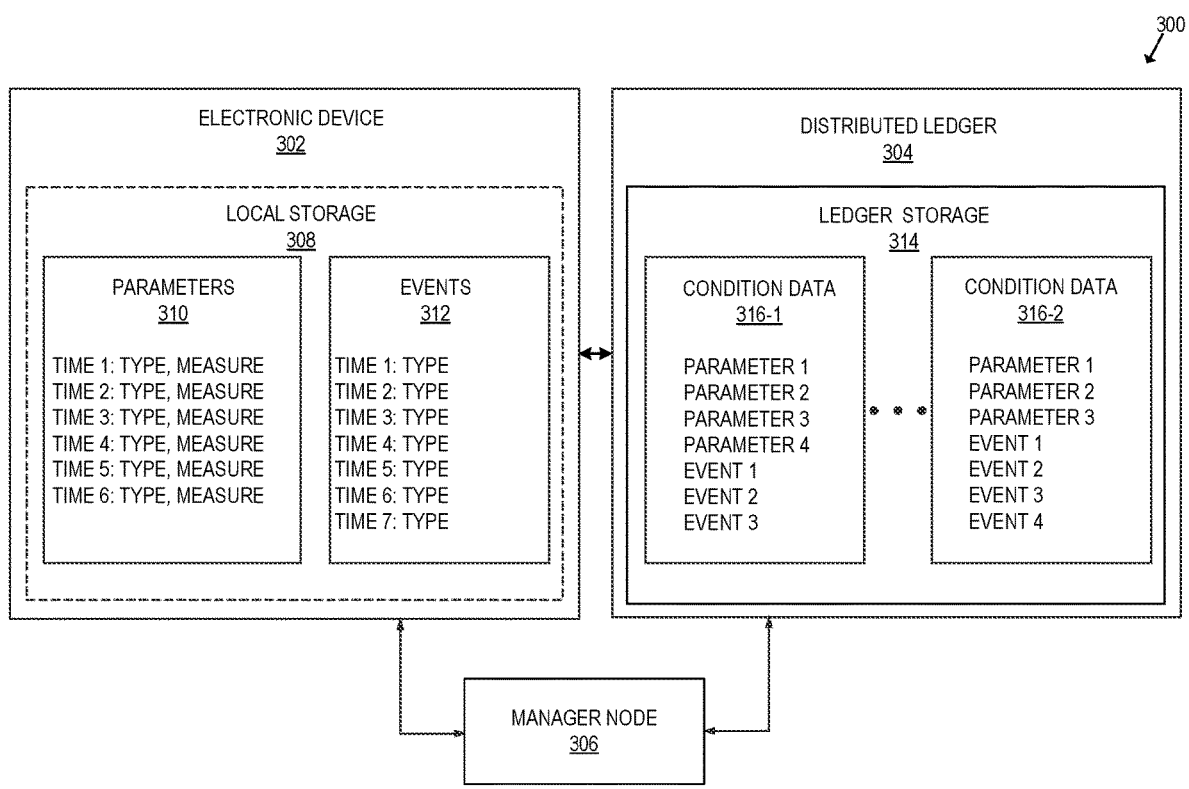
FIG. 3 is a block diagram that illustrates locations of condition data used to determine a condition of an electronic device.

FIG. 3 is a block diagram that illustrates locations 300 of condition data used to determine a condition of an electronic device. An electronic device 302 (e.g., electronic device 202) is communicatively coupled to the distributed ledger 304 (e.g., distributed ledger 208) over a network (e.g., network(s) 204) via a manager node 306 (e.g., the manager node 210). In some embodiments, the manager node 306 is a network node of the distributed ledger 304.

The electronic device 202 can include a local storage 308 that can store condition data including lists of parameters 310 and events 312. In some embodiments, the local storage 308 includes non-volatile and/or volatile memory that can store the condition data as needed and provide it to the manager node 306. The parameters 310 are monitored by the electronic device 302 and corresponding values are stored as units of condition data including type attribute and corresponding measure value captured at points in time. Likewise, the events 312 are units of condition data each with a type attribute and point in time when the event occurred.

The electronic device 302 can push condition data out according to a schedule or upon the occurrence of an event. For example, the electronic device 302 can push condition data out to the manager node 306 periodically (e.g., weekly). In another example, the electronic device 302 can push condition data to the manager node 306 in response to the occurrence of an event that affects the condition of the electronic device 302 or upon connection of the electronic device 302 to a network coupled to the manager node 306. In some embodiments, the manager node 306 can control when to pull condition data from the electronic device (e.g., on schedule, on-demand).

The manager node 306 can push condition data to the distributed ledger 304, which stores the condition data in a ledger storage 314. The contents of the local storage 308 and the ledger storage 314 can be the same or different. For example, the manager node 306 can process condition data obtained from various electronic devices and push the processed condition data for the distributed ledger 304. The ledger storage 314 can store the condition data in distinct sections or containers represented as condition data 316-1 and condition data 316-2 for respective electronic devices. In another example, the manager node 306 can process the condition data through a hashing function to further secure the condition data stored at the distributed ledger 304.

The local storage 308 is optional because the electronic device 302 does not need to maintain condition data in non-volatile memory. Instead, the electronic device 302 can instantaneously communicate condition data to the manager node 306 in response to the generation of the condition data. In some embodiments, the contents of the local storage 308 can be accessed by the electronic device 302 independent of the manager node 306 (e.g., while disconnected from any network). For example, the electronic device 302 can have monitoring functionality that is meant to alert the user of any harmful conditions. The same data collected for the user can be communicated to the ledger storage 314 as a third-party trusted repository of condition data that can be subsequently used to verify a current condition of the electronic device 308. Overall, the ledger storage 314 can include one or more records that store data fields and timestamps for each sensor in the electronic device 302, such as timestamped accelerometer data representing each time the device had been dropped and a force value related to a magnitude of the impact from the fall, timestamped temperature data representing each time a temperature of the device exceeded a threshold, timestamped moisture/humidity data reflecting how long and "how wet" the device had become, counter data representing each time the device was recharged (and for how long and what starting and ending battery charge amounts were), etc. The ledger storage 314 includes memories of peer nodes of the distributed ledger 304. The contents of the ledger storage 314 can be accessible by the manager node 306, the electronic device 302, or any third party that seeks to independently determine a current condition of the electronic device 302. Accordingly, the contents of the local storage 308 and/or the ledger storage 314 is the basis for determining a current condition of the electronic device 302.

Determining a Current Condition

Figure 4:
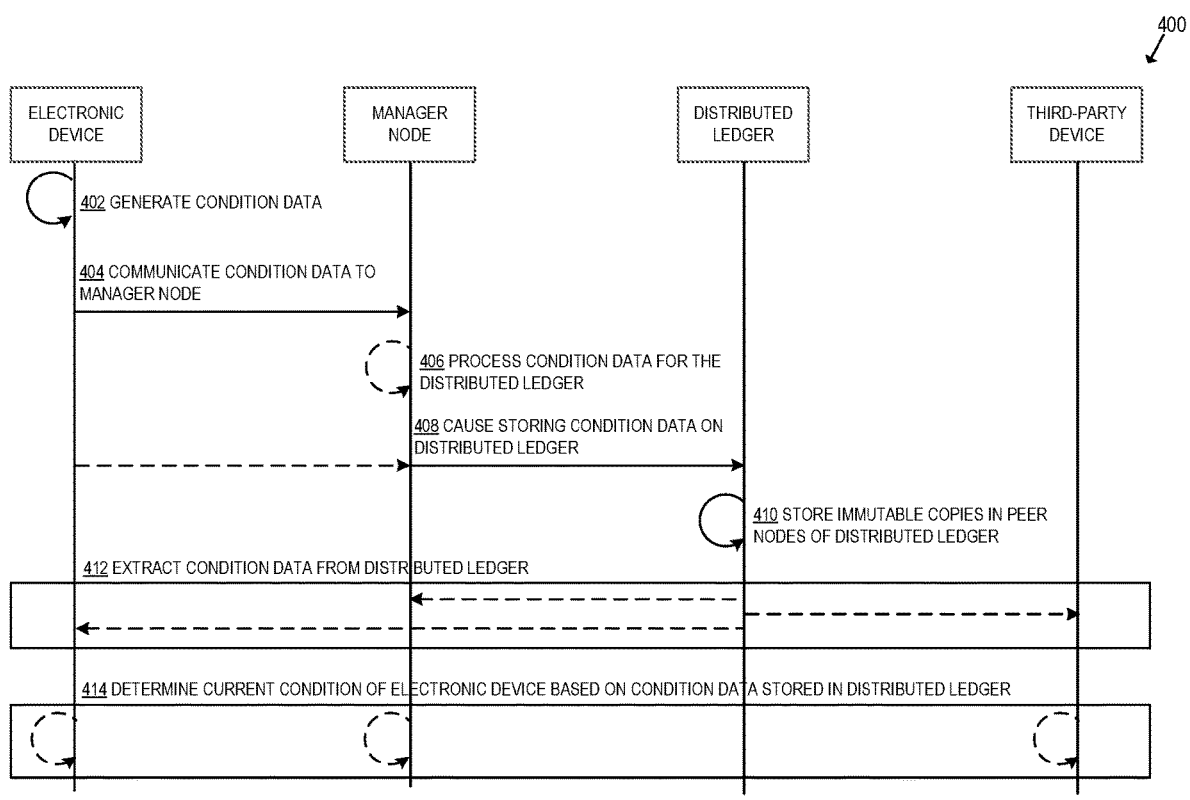
FIG. 4 is a flow diagram of a process for determining a condition of an electronic device based on condition data stored in a distributed ledger.

FIG. 4 is a flow diagram of a process 400 for determining a current condition of an electronic device. The process includes operations performed by a distributed network including electronic devices, a network of peer nodes that store a distributed ledger, and a manager node that mediates collection of condition data and storage of the condition data on the distributed ledger. The manager node can also retrieve condition data stored on the distributed ledger for analysis to determine the condition of an electronic device. In one example, the electronic device is a smartphone leased by a user, the network is a wireless telecommunications network operated by a telecommunications service provider, and the condition data is obtained from multiple sensors of the leased smartphone over the telecommunications network. Examples of the sensors include an accelerometer, a temperature monitoring sensor, a moisture sensor, and a battery monitoring circuit (not shown).

At 402, an electronic device generates condition data. The condition data includes units that are indicative of a condition of the electronic device. In one example, a unit of condition data is generated by one of the sensors of the electronic device that performs an ongoing measurement of a parameter. The condition of the electronic device can be determined based at least in part on the measured value of the parameter. In another example, a unit of condition data indicates a detected occurrence of an event that affects the condition of the electronic device. For example, the event can be a detected impact that resulted from a user dropping a smartphone.

In one example, a unit of condition data is generated by a sensor of the electronic device in accordance with ongoing measurements of a parameter of the electronic device. In another example, a unit of condition data is a detected occurrence of an anomalous event that affects the condition of the electronic device. An example of the ongoing measurement is a lifetime measure of battery utilization. An example of a detected event is a physical impact on the electronic device. The units of condition data are stored in the distributed ledger in accordance with a regular schedule or in response to the occurrence of an event (e.g., an event that affects the condition of the electronic device). Other examples of condition data include a measure of a parameter of the electronic device captured over a period of time by multiple sensors such as a measure of lifetime utilization.

At 404, the manager node obtains the units of condition data over the network from the electronic device(s). The manager node is a network node of a system that includes electronic devices and network nodes of the distributed ledger. In some embodiments, the manager node operates independently of the electronic device and the distributed ledger. In some embodiments, the manager node is included in the electronic device or one or more peer nodes the store the distributed ledger. At 406, the manager node can optionally process the condition data. For example, the manager node can filter, sort, and encrypt condition data to limit the data stored in the distributed ledger At 408, the electronic device or manager node can cause the distributed ledger to store the condition data. At 410, the distributed ledger stores substantially (e.g., mostly) immutable copies of the condition data across other network nodes of a peer-to-peer network. Specifically, each of the peer nodes replicates and stores an identical copy of the units of condition data and updates independently in accordance with the principles of distributed ledger technologies. Examples of distributed ledgers include a public blockchain or a private blockchain. The condition data stored in the distributed ledger is trustworthy because it is tamper-proof.

At 412, condition data is extracted from the distributed ledger to determine the condition of the electronic device. More specifically, the manager node, the electronic device, or a third-party service can access at least some of the condition data in the distributed ledger to independently perform the determination.

At 414, a current condition of an electronic device is determined based on the units of condition data stored in the distributed ledger. There are various operations of algorithms that can be performed to determine the current condition of the electronic device. In one example, the condition data stored in a distributed ledger is extracted and compared against device-specific reference data that provides a standard scale for a current condition. As such, the determination of a current condition of the electronic device is determined based on an outcome of the comparison of the condition data obtained from the distributed ledger with the device-specific reference data. In some embodiments, the current condition is an ongoing condition that is tracked by continuously collecting units of condition data for the same parameters.

Figure 5:
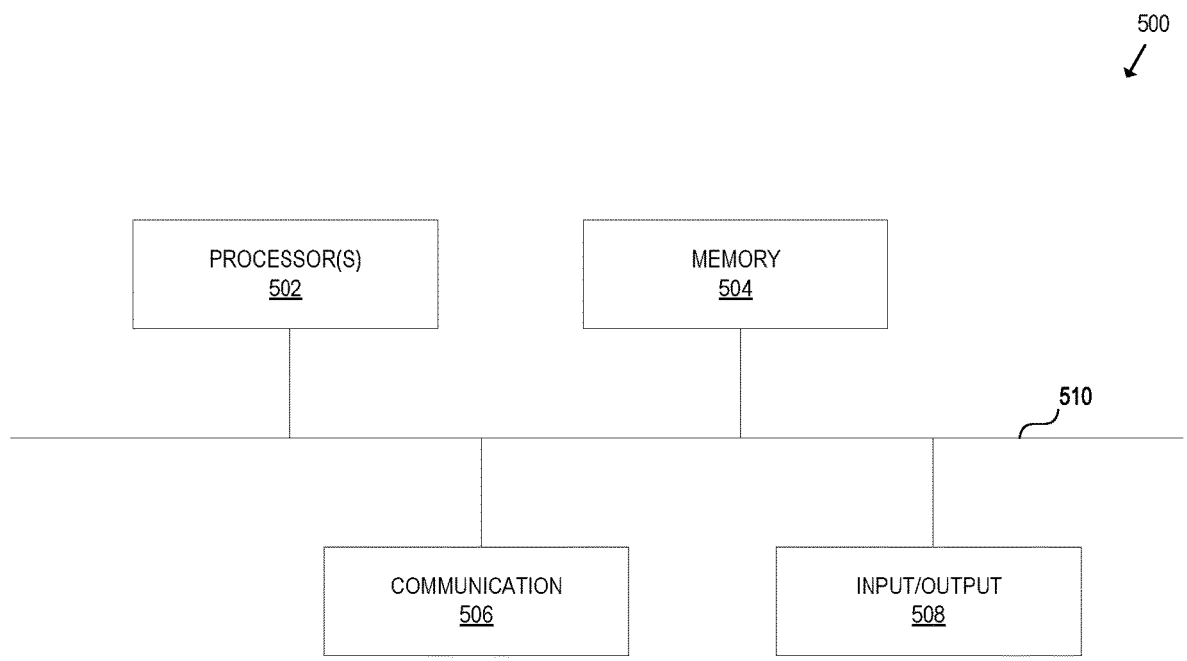
FIG. 5 is a block diagram that illustrates an example processing system in which aspects of the disclosed technology can be embodied.

FIG. 5 is a block diagram that illustrates an example of a processing system 500 in which at least some operations described herein can be implemented. The processing system 500 represents a system that can run any of the methods/algorithms described herein. For example, any network access device (e.g., electronic device 202 or 302) or network component (access node 206-1 or manager node 210) can include or be part of a processing system 500. The processing system 500 can include one or more processing devices, which can be coupled to each other via a network or multiple networks. A network can be referred to as a communication network or telecommunications network.

In the illustrated embodiment, the processing system 500 includes one or more processors 502, memory 504, a communication device 506, and one or more input/output (I/O) devices 508, all coupled to each other through an interconnect 510. The interconnect 510 can be or include one or more conductive traces, buses, point-to-point connections, controllers, adapters and/or other conventional connection devices. Each of the processor(s) 502 can be or include, for example, one or more general-purpose programmable microprocessors or microprocessor cores, microcontrollers, application-specific integrated circuits (ASICs), programmable gate arrays, or the like, or a combination of such devices.

The processor(s) 502 control the overall operation of the processing system 500. Memory 504 can be or include one or more physical storage devices, which can be in the form of random-access memory (RAM), read-only memory (ROM) (which can be erasable and programmable), flash memory, miniature hard disk drive, or other suitable type of storage device, or a combination of such devices. Memory 504 can store data and instructions that configure the processor(s) 502 to execute operations in accordance with the techniques described above. The communication device 506 can be or include, for example, an Ethernet adapter, cable modem, Wi-Fi adapter, cellular transceiver, Bluetooth transceiver, or the like, or a combination thereof. Depending on the specific nature and purpose of the processing system 500, the I/O devices 508 can include devices such as a display (which can be a touch screen display), audio speaker, keyboard, mouse or other pointing devices, microphone, camera, etc.

While processes or blocks are presented in a given order, alternative embodiments can perform routines having steps or employ systems having blocks, in a different order, and some processes or blocks can be deleted, moved, added, subdivided, combined and/or modified to provide alternative or sub-combinations, or can be replicated (e.g., performed multiple times). Each of these processes or blocks can be implemented in a variety of different ways. In addition, while processes or blocks are at times shown as being performed in series, these processes or blocks can instead be performed in parallel or can be performed at different times. When a process or step is "based on" a value or a computation, the process or step should be interpreted as based at least on that value or that computation.

Software or firmware to implement the techniques introduced here can be stored on a machine-readable storage medium and can be executed by one or more general-purpose or special-purpose programmable microprocessors. A "machine-readable medium", as the term is used herein, includes any mechanism that can store information in a form accessible by a machine (a machine can be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above, or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing system 500 can be implemented as circuitry, firmware, software, other executable instructions, or any combination thereof. For example, the functional components can be implemented in the form of special-purpose circuitry, in the form of one or more appropriately programmed processors, a single board chip, a field-programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory can be a volatile or non-volatile memory. In some embodiments, the volatile memory can be considered "non-transitory" in the sense that it is not a transitory signal. Memory space and storage described in the figures can be implemented with the tangible storage memory as well, including volatile or non-volatile memory.

Each of the functional components can operate individually and independently of other functional components. Some or all of the functional components can be executed on the same host device or on separate devices. The separate devices can be coupled through one or more communication channels (e.g., wireless or wired channel) to coordinate their operations. Some or all of the functional components can be combined as one component. A single functional component can be divided into sub-components, each sub-component performing separate method steps or a method step of the single component.

In some embodiments, at least some of the functional components share access to a memory space. For example, one functional component can access data accessed by or transformed by another functional component. The functional components can be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems, and devices described above can include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to the desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above-detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes, message/data flows, or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges. Those skilled in the art will also appreciate that the actual implementation of a database can take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects can likewise be embodied in a computer-readable medium. Accordingly, the inventors reserve the right to add additional claims after filing the application to pursue such additional claim forms for other aspects of the technology.

We claim:

1. A method performed by a manager node coupled to a wireless telecommunications network for determining a resale value of a handheld wireless device based on a used condition, wherein the handheld wireless device is an electronic device configured to communicate data over the wireless telecommunications network, the method comprising:

remotely selecting, by the manager node, which of multiple types of parameters are to be monitored by the handheld wireless device and a schedule for reporting condition data associated with the selected parameters to the manager node over the telecommunications network;

receiving, in accordance with the schedule, condition data including parameter values that are indicative of a condition of the handheld wireless device, wherein each parameter value is generated by a sensor or circuitry of the handheld wireless device that performs measurement of a parameter of the handheld wireless device or indicates detection of an occurrence of an event that affects the condition of the handheld wireless device;

transforming, based on a first hash function, the parameter values into hashed parameter values;

storing the hashed parameter values in a public blockchain that is cryptographically secured based on a second hash function other than the first hash function;
in response to a request to determine the resale value of the handheld wireless device:
accessing the hashed parameter values from the public blockchain;
comparing the hashed parameter values to reference parameter data that is specific for a make or model of the handheld wireless device; and
determining the resale value of the handheld wireless device based on the comparison between the hashed parameter values stored in the public blockchain and the reference parameter data.

2. The method of claim 1, wherein the condition is an ongoing condition, the method further comprising:
tracking the ongoing condition of the handheld wireless device by collecting additional condition data on a regular basis.

3. The method of claim 1, wherein the handheld wireless device is a leased smartphone, and receiving the condition data of the leased smartphone comprises:
collecting the condition data from multiple sensors of the leased smartphone over the wireless telecommunications network,
wherein the multiple sensors include at least two of an accelerometer, a temperature monitoring sensor, a moisture sensor, or a battery monitoring sensor.

4. The method of claim 1, wherein a first parameter value is generated and stored in the public blockchain in response to the occurrence of the event that affects the condition of the handheld wireless device.

5. The method of claim 1, wherein a first parameter value is generated by a first sensor of the handheld wireless device that performs an ongoing measurement of a first parameter of the handheld wireless device and a second parameter value indicates a detection of an occurrence of a sporadic event that occasionally affects the condition of the handheld wireless device.

6. The method of claim 1, wherein a first unit of parameter value is indicative of a physical impact on the handheld wireless device and a second parameter value is a measure of battery utilization.

7. The method of claim 1, wherein the handheld wireless device collects and locally stores the condition data that are indicative of a current condition of the handheld wireless device.

8. The method of claim 1, wherein the handheld wireless device is a tablet computer, and the communications network is a cellular wireless telecommunications network.

9. The method of claim 1, wherein the handheld wireless device is a smartphone, and the resale value of the handheld wireless device is determined by a third-party other than an operator of the wireless telecommunications network.

10. At least one non-transitory computer-readable storage medium carrying instructions that, when executed by a computing system, cause the computing system to perform operations for determining a resale value of a wireless device based on condition data stored in a public blockchain, the operations comprising:
setting which type of parameter is to be monitored by the wireless device and a schedule for reporting condition data associated with the parameter over a wireless network;
obtaining the condition data that includes a measurement of a parameter value of the wireless device and an indication of a detection of an event that affects a condition of the wireless device,
transforming, based on a first hash function, the parameter value into a hashed parameter value; and
storing the hashed parameter value in the public blockchain that is cryptographically secured based on a second hash function other than the first hash function;
in response to a request to determine the resale value of the wireless device:
accessing the hashed parameter values from the public blockchain;
comparing the hashed parameter values to reference parameter data that is specific for a make or model of the wireless device; and
determining the resale value of the wireless device based on a comparison between the hashed parameter value stored in the public blockchain and the reference parameter data.

11. The computer-readable storage medium of claim 10, wherein the parameter value is generated by a sensor of the wireless device.

12. The computer-readable storage medium of claim 10, wherein the operations are performed by a manager node other than the wireless device, and wherein the manager node is communicatively coupled to the public blockchain.

13. The computer-readable storage medium of claim 10, wherein the operations are performed by the wireless device.

14. The computer-readable storage medium of claim 10, collecting the condition data comprises:
collecting the condition data from multiple sensors of the wireless device,
wherein the sensors include an accelerometer, a temperature sensor, or a battery sensor.

15. The computer-readable storage medium of claim 10, wherein a first parameter value is generated and stored in the public blockchain in response to an occurrence of the event that affects the condition of the wireless device.

16. A system comprising:
at least one hardware processor; and
at least one non-transitory memory, coupled to the at least one hardware processor and storing instructions, which, when executed by the at least one hardware processor, cause the system to:
remotely select which of multiple types of parameters are to be monitored by a handheld wireless device and a schedule for reporting condition data associated with the selected parameters over a telecommunications network to a network node;
receive, in accordance with the schedule, condition data including parameter values that are indicative of a condition of the handheld wireless device,
wherein each parameter value is generated by a sensor or circuitry of the handheld wireless device that performs measurement of a parameter of the handheld wireless device or indicates detection of an occurrence of an event that affects the condition of the handheld wireless device;
transform, based on a first hash function, the parameter values into hashed parameter values;
store the hashed parameter values in a public blockchain that is cryptographically secured based on a second hash function other than the first hash function;
in response to a request to determine a resale value of the handheld wireless device:
access the hashed parameter values from the public blockchain;

compare the hashed parameter values to reference parameter data that is specific for a make or model of the handheld wireless device; and determine the resale value of the handheld wireless device based on the comparison between the hashed parameter values stored in the public blockchain and the reference parameter data.

17. The system of claim 16, wherein a first parameter value is generated and stored in the public blockchain in response to the occurrence of the event that affects the condition of the handheld wireless device.

18. The system of claim 16, wherein a first parameter value is generated by a first sensor of the handheld wireless device that performs an ongoing measurement of a first parameter of the handheld wireless device and a second parameter value indicates a detection of an occurrence of a sporadic event that occasionally affects the condition of the handheld wireless device.

19. The system of claim 16, wherein a first parameter value is indicative of a physical impact on the handheld wireless device and a second parameter value is a measure of battery utilization.

20. The system of claim 16, wherein the handheld wireless device collects and locally stores the condition data that are indicative of a current condition of the handheld wireless device.

* * * * *